W. A. RIDER.
CATERPILLAR TRACTOR.
APPLICATION FILED MAY 10, 1915.
1,183,669.
Patented May 16, 1916.
3 SHEETS—SHEET 1.
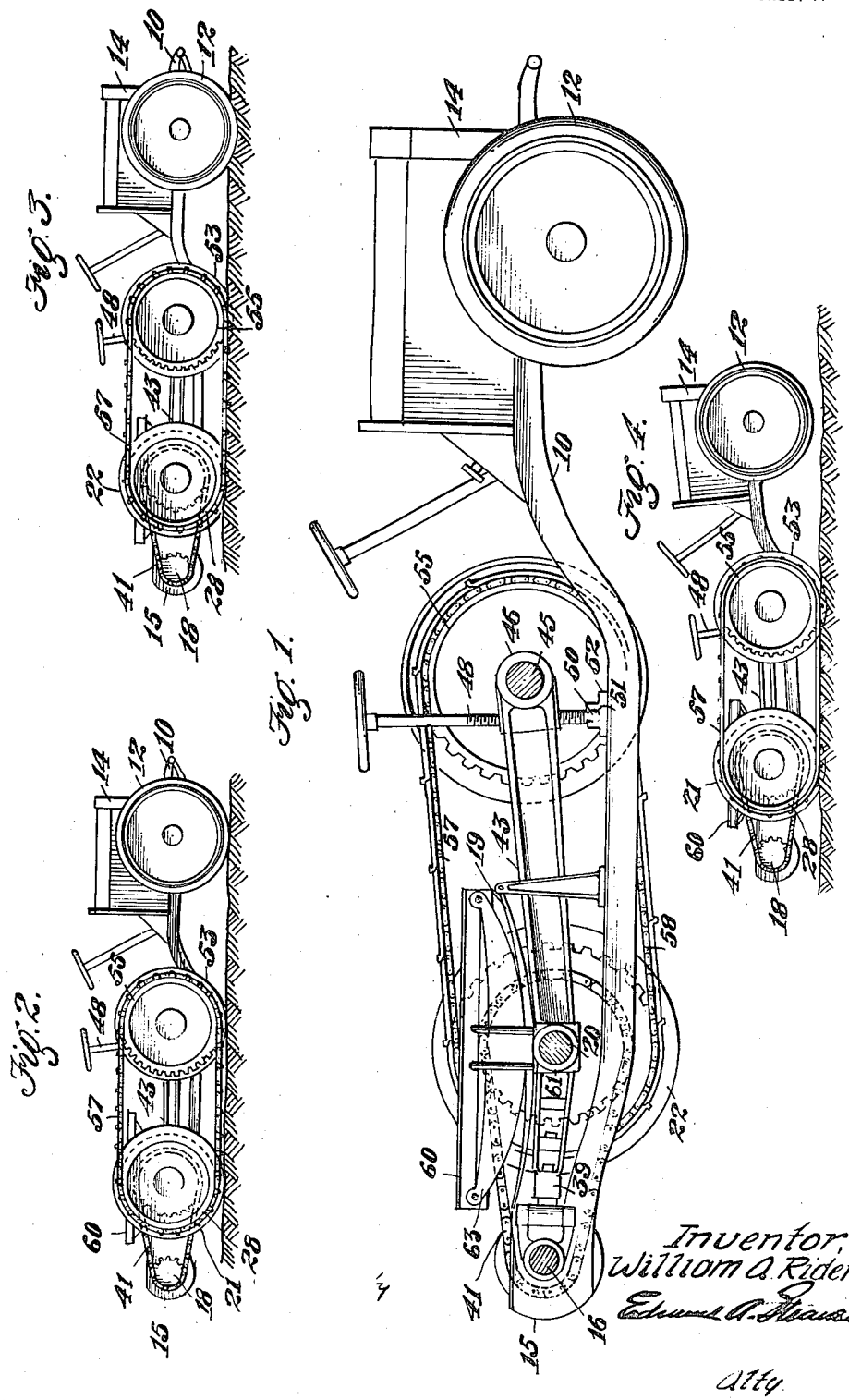

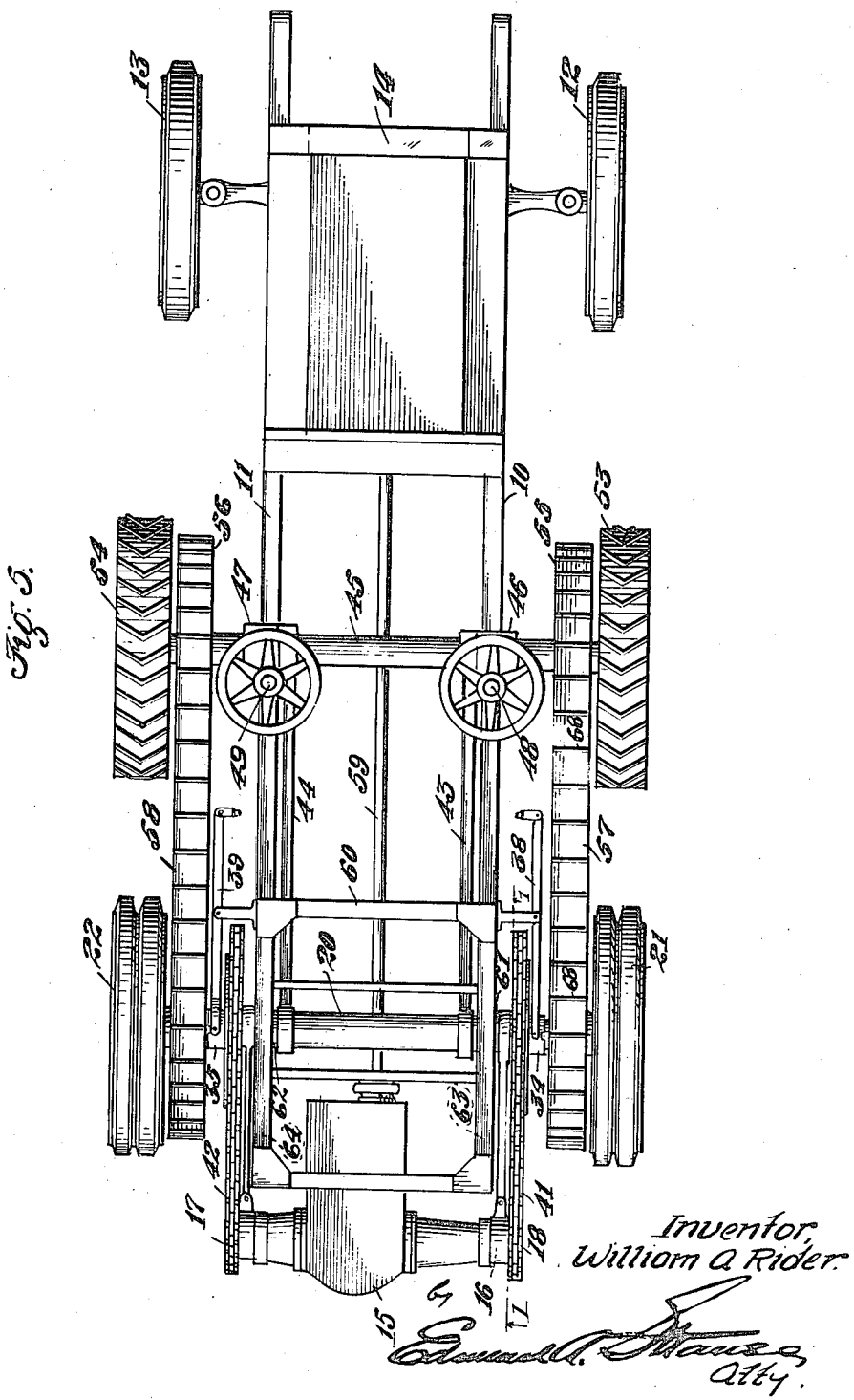

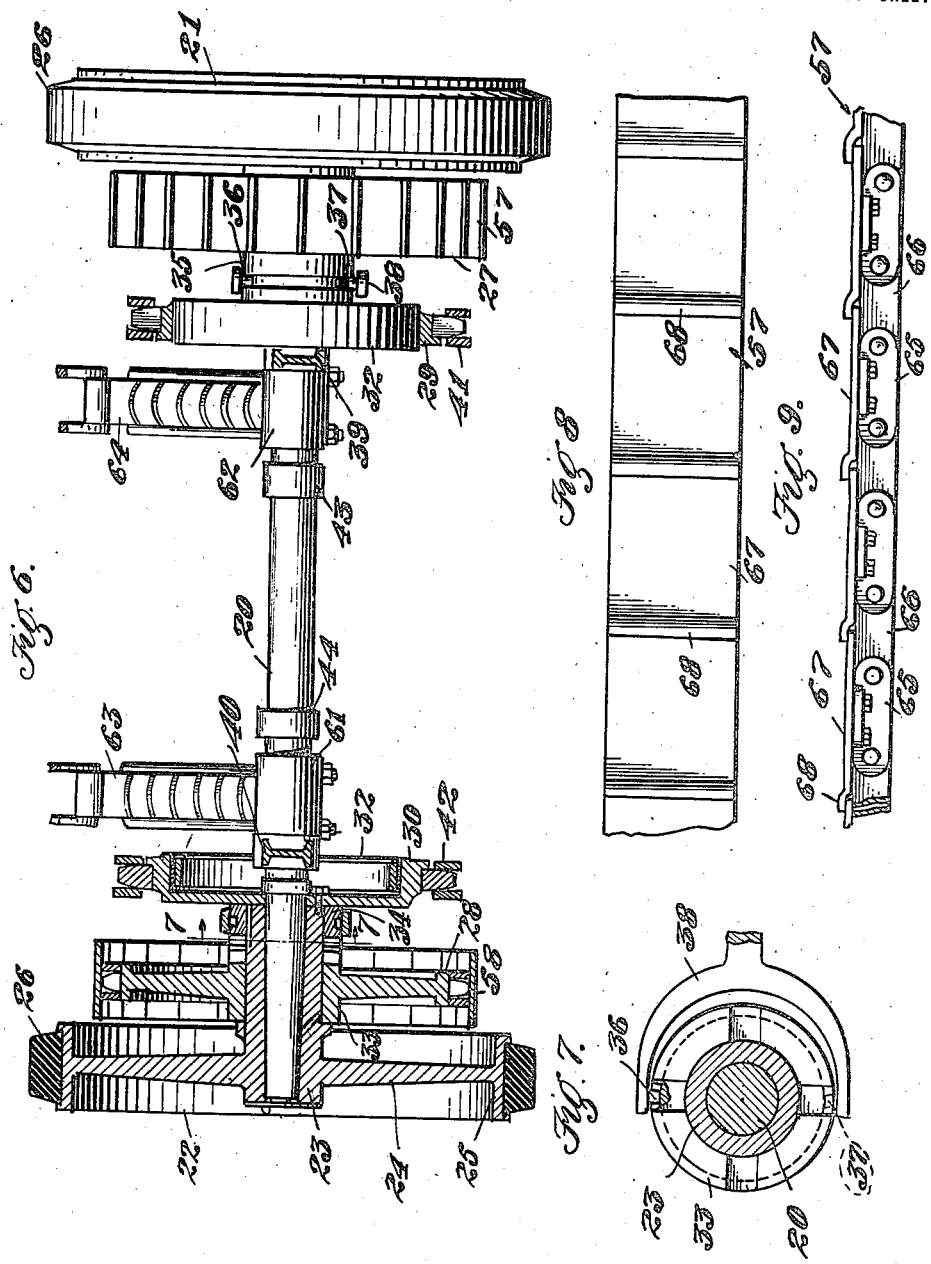

UNITED STATES PATENT OFFICE.

WILLIAM A. RIDER, OF LOS ANGELES, CALIFORNIA.

CATERPILLAR-TRACTOR.

1,183,669.

Specification of Letters Patent.

Patented May 16, 1916.

Application filed May 10, 1915. Serial No. 26,967.

*To all whom it may concern:*

Be it known that I, WILLIAM A. RIDER, a citizen of the United States, residing at Los Angeles, in the county of Los Angeles and State of California, have invented new and useful Improvements in Caterpillar-Tractors, of which the following is a specification.

This invention relates to tractors and especially to a tractor which can be used with a caterpillar chain or with driving ground wheels at the will of the operator.

It is an object of this invention to provide a tractor construction whereby the tractor may be driven by means of either driving ground wheels or caterpillar chains at the will of the operator.

It is a further object of this invention to provide a tractor construction which embodies a caterpillar chain and permits a small turning radius.

It is a still further object of this invention to provide a tractor construction such that the entire weight of the tractor may be carried upon the caterpillar chain, thereby securing a high tractive effort.

Heretofore tractors suitable for highway use have been constructed with driving ground wheels, whereby relatively high speed will be attained, but the ground wheels of such tractors when used upon soft ground sink in and the tractor becomes stalled. Tractors which depend upon caterpillar chains are useful where the tractor must move over soft ground, but are not adaptable for movement upon highways due to the slow speed at which such caterpillar chains must be operated.

My construction consists of a tractor having mounted upon its frame a primary pair of driving ground wheels and a secondary pair of driving ground wheels which may be adjusted vertically so that when upon soft ground, the weight of the vehicle may be distributed upon two pairs of wheels by merely lowering the secondary pair of driving wheels. A caterpillar chain is geared between the primary and secondary driving wheels, whereby if the tractor sinks into the ground, the tractive effort will be taken by the caterpillar chain. The wheel base of my tractor is made short by positioning a jack shaft in the rear of and gearing it to the primary pair of driving wheels and gearing the jack shaft to the driving wheels.

I attain these objects by means of the embodiment of my invention disclosed in the accompanying drawing, in which:

Figure 1 is a side elevation of my improved tractor partly in section, the view being taken along the line 1—1 of Fig. 5. Fig. 2 is a side elevation of my tractor with the secondary driving wheel lowered, so that the driving is accomplished by the primary and secondary wheels. Fig. 3 is a side elevation of my tractor illustrating its operation upon soft ground, with the primary and secondary driving wheels sunk into the ground to such a point that the caterpillar chains produce the tractive effort. Fig. 4 is a side elevation of my tractor showing the secondary driving wheels lowered to a point whereby the front steering wheels are lifted from the ground. Fig. 5 is a plan view of my tractor. Fig. 6 is a rear elevation with parts in section. Fig. 7 is an enlarged fragmentary section taken on the line 7—7 of Fig. 6, showing the clutch and its operating means. Fig. 8 is is a plan view of a fragment of the caterpillar chain. Fig. 9 is a side elevation of a fragment of the caterpillar chain.

More specifically, 10 and 11 indicate the side bars of the tractor frame which are connected by suitable cross pieces. Side bars 10 and 11 which are of similar construction are formed to underhang the driving axles of the tractor. Secured to the front part of the frame by any well known construction and connected to a steering wheel are the wheels 12 and 13. A hood 14 is disposed in the usual position at the front of the frame and conceals the prime mover and auxiliary driving apparatus. Secured to the rear end of the frame is a housing 15 within which are the jack shaft, differential gearing and speed changing gears which may be of any well known type. The jack shaft 16 mounted within the housing 15 is a divided jack carrying at its ends sprocket wheels 17 and 18. A propeller shaft 59 extends from the engine to the housing 15, whereby power may be conveyed to the jack shaft 16. Supported upon springs 19 disposed on the side bars 10 and 11 of the frame is an axle 20 upon which are rotatably disposed the primary driving ground wheels 21 and 22. The driving wheels 21 and 22 comprise hubs 23 provided with disks 24 to which fellies 25 are secured. Instead of disk 24, spokes of any form desired may be used. Tires 26 are provided which may consist of blocks or of solid resilient bands. Rotatably mounted upon hubs 23 are caterpillar sprocket wheels 27 and 28. Secured to hubs 23 are driven sprocket wheels 29 and 30 which are comprised of brake cylinders 32 with which expanding clutch arms are adapted to engage. The peripheries of sprocket wheels 29 and 30 are provided with teeth. The caterpillar sprocket wheels 27 and 28 are provided with hubs 33 which have slots adapted to be engaged by teeth upon clutches 34 and 35, thereby forming a jaw clutch. Clutches 34 and 35 are splined to hubs 23 so that they may be moved longitudinally and thrown into engagement with the slots in the hubs 33 of caterpillar sprocket wheels 27 and 28, thereby locking the caterpillar sprocket wheels to the driven sprocket wheels 29 and 30. Each of the clutches 34 and 35 is provided with recesses in their peripheral surfaces which are engaged by pins 36 and 37, the latter being disposed upon the arms of yoke members 38 which are connected to suitable operating mechanism which may be disposed at a position convenient for operation by the driver.

Adjustable radius rods 39 and 40 are pivotally mounted upon the driving axle 20 secured to the housing 15. Sprocket chains 41 and 42 are trained over the sprocket wheels 17 and 30 and 18 and 31. Extending forwardly from the rear driving axle 20 and pivotally connected thereto are radius rods 43 and 44, which latter rods are pivotally connected to the rear axle 20 and have rotatably mounted in their forward ends a driving axle 45. Rotatably mounted upon driving axle 45 are blocks 46 and 47 which are provided with threaded apertures adapted to be engaged by hand screws 48 and 49. The lower ends of hand screws 48 and 49 are provided with balls 50 which are disposed in sockets 51 with which blocks 52 are provided. Blocks 52 are secured by any well known means to the side bar members 10 and 11. Rotatably mounted upon the ends of shaft 45 are secondary driving ground wheels 53 and 54. Fixedly secured to driving wheels 53 and 54 are caterpillar sprocket wheels 55 and 56. Caterpillar sprocket chains 57 and 58 are geared to sprocket wheels 27 and 55, and 28 and 56. A frame 60 is supported upon driving axle 20 by means of blocks 61 and 62 which are secured to the driving axle and carry springs 63 and 64 upon which the frame 60 rests. The frame is adapted to carry the load which is mounted upon it. Caterpillar chains 57 and 58 may be of any type convenient for the particular use to which the tractor is to be applied, such as a chain comprised of sets of links 65 and 66. Secured to links 65 are flights 67, each flight having an offset portion 68 at one end which is adapted to overlap the adjacent flight. The offset portions provide treads which will grip the ground.

If it is desired to use the tractor upon highways having fairly good roads, the secondary driving wheels 53 and 54 are lifted into the position shown in Fig. 1. This is accomplished by turning the hand screws 47 and 48, thereby lifting the axle 45. Clutches 34 and 35 are thrown out of engagement so that the caterpillar chains or the secondary driving wheels 53 and 54 which are geared to the primary driving wheels through the caterpillar chains will not be operated. As the secondary driving wheels are not in contact with the ground the driving takes place from the primary driving wheels 21 and 22 and the higher speeds of which the tractor is capable may be attained.

Where the vehicle encounters a surface not sufficiently hard to properly support the primary driving wheels, the hand wheels 47 and 48 are operated to lower the axle 45 into position shown in Fig. 2, the clutches 34 and 35 are engaged with the caterpillar sprocket wheels whereupon the driving effort will be distributed over the primary and secondary driving wheels and the total load will be carried upon three pairs of wheels. If the surface of the ground is soft enough for the tractor wheels to sink therein, the caterpillar chains will engage the surface of the ground and the tractor will be propelled by the caterpillar as shown in Fig. 3.

If it is desired to increase the tractive effort, the secondary driving wheels may be lowered still further so that the tractor wheels are in the position shown in Fig. 4, the front wheels being raised from the ground and the entire load being raised from the ground and the entire load being carried upon the caterpillar chains. In this position the front wheels can not be used in steering and other means must be used; the brakes 31 and 32 can be operated to cause a difference in speed of the caterpillar chains and thereby the direction of the tractor may be controlled.

It will be noted that a short wheel base is secured by reason of the jack shaft being placed in the rear of the driving wheels; this permits a short turning radius.

What I claim is:

1. A tractor, comprising in combination a frame, front ground wheels mounted thereon, primary driving ground wheels secured to said frame, vertical adjustable secondary drive ground wheels secured to said frame, and a traction driving means mounted on said frame with its traction surface normally disposed above the ground engaging surface of said ground wheels whereby the ground wheels come into action ahead of said traction driving means.

2. A tractor comprising in combination a frame, front ground wheels mounted thereon, primary driving ground wheels secured to said frame, vertically adjustable secondary driving ground wheels secured to said frame, and an endless traction belt geared to said primary and secondary driving ground wheels, whereby the ground wheels come into action ahead of said belt.

3. A tractor comprising in combination a frame, front ground wheels mounted thereon, primary driving ground wheels mounted on said frame, secondary driving ground wheels mounted on said frame, means for adjusting said secondary driving ground wheels vertically, and an endless traction belt geared to said primary and secondary driving ground wheels, whereby the ground wheels come into action ahead of said belt.

4. A tractor comprising in combination a frame, front ground wheels mounted thereon, rear driving ground wheels mounted on said frame, belt wheels secured to said rear ground wheels, front driving ground wheels, belt wheels secured to the latter, an endless traction belt geared to said belt wheels, and means for vertically adjusting said front driving ground wheels, whereby the ground wheels come into action ahead of said belt.

5. A tractor comprising in combination a frame, front ground wheels mounted thereon, a driving axle, rear driving ground wheels mounted thereon, sprocket wheels secured to said driving ground wheels, radius rods mounted pivotally in alinement with said driving axle, front driving ground wheels secured to said radius rods, sprocket wheels secured thereto, caterpillar chains engaged with said sprocket wheels, and means for vertically adjusting said front driving ground wheels, whereby the ground wheels come into action ahead of said caterpillar chains.

6. A tractor comprising in combination a frame, front ground wheels mounted thereon, a driving axle, rear driving ground wheels mounted thereon, sprocket wheels secured to said rear driving ground wheels, radius rods mounted pivotally in alinement with said driving axle, front driving ground wheels secured to said radius rods, sprocket wheels secured to said front driving ground wheels, caterpillar chains geared to said sprocket wheels, means for vertically adjusting said front driving ground wheels, a prime mover mounted on the frame, a jack shaft mounted on said frame in the rear of said driving shaft, gearing connecting said driving shaft and jack shaft, and gearing connecting said driving shaft and the prime mover, whereby the ground wheels come into action ahead of said caterpillar chains.

7. A tractor comprising in combination a frame, front ground wheels mounted thereon, a driving axle, rear driving ground wheels mounted thereon, caterpillar sprocket wheels secured to said driving ground wheels, driven sprocket wheels secured to said driving ground wheels, front driving ground wheels, caterpillar sprocket wheels secured thereto, endless caterpillar belts geared to said caterpillar sprocket wheels, means for vertically adjusting said front driving ground wheels, a jack shaft mounted on said frame in the rear of said driving axle, sprocket wheels on said jack shaft, sprocket chains geared to the driven sprocket wheels on said jack shaft and to said driven sprocket wheels, and a propeller shaft geared to said jack shaft, whereby the ground wheels come into action ahead of said caterpillar belts.

8. A tractor comprising in combination a frame, front ground wheels mounted thereon, a rear driving axle, rear driving ground wheels mounted thereon, caterpillar sprocket wheels secured to said rear driving ground wheels, driven sprocket wheels secured to said driving grounds wheels, radius rods pivotally mounted on said driving axle, a front driving axle secured thereto, front driving ground wheels mounted on said front driving axle, caterpillar sprocket wheels secured to said front driving ground wheels, caterpillar chains geared to said caterpillar sprocket wheels, a screw secured to said frame and engaging a threaded member secured to said front driving axle, a jack shaft mounted in the rear of said rear driving axle, and sprocket chains geared to said jack shaft and driven sprocket wheel, whereby the ground wheels come into action ahead of said caterpillar chains.

9. A tractor, comprising in combination a frame, a prime mover thereon, a pair of primary ground wheels upon which said frame is supported, a pair of secondary ground wheels, means between the frame and the secondary ground wheels for imparting movement to said wheels with relation to said frame, and caterpillar chains geared to and moving with the primary and secondary ground wheels whereby the ground wheels come into action ahead of said chains.

10. A tractor, comprising in combination a frame, front ground wheels mounted on said frame, a driving axle on said frame, rear driving ground wheels mounted on said axle, rear sprocket wheels secured to said rear driving ground wheels, radius rods mounted pivotally in alinement with said driving axle, front driving ground wheels secured to said radius rods, front sprocket wheels secured to said front driving ground wheels, caterpillar chains rove over and extending between said front and rear sprocket wheels, means for vertically adjusting said front driving ground wheels, a prime mover mounted upon the frame, a jack shaft mounted on said frame in the rear of said driving shaft, gearing connecting said driving shaft and jack shaft, and gearing connecting said driving shaft and the prime mover.

11. A tractor comprising in combination a frame, front ground wheels mounted thereon, a driving axle thereon, rear driving ground wheels mounted on said axle, caterpillar driving sprocket wheels secured to said driving ground wheels, driven sprocket wheels arranged to be concentrically secured to said driving ground wheels, front driving ground wheels, caterpillar driven sprocket wheels secured thereto with their axes in fixed relation to the front ground wheel axes, endless caterpillar belts rove over said caterpillar driving and driven sprocket wheels, means for vertically adjusting said front driving ground wheels, a jack shaft mounted on said frame in the rear of said driving axle, sprocket wheels on said jack shaft, sprocket chains geared to the driven sprocket wheels on said jack shaft and to said driven sprocket wheels, and a propeller shaft geared to said jack shaft.

12. A tractor, comprising in combination a frame, front ground wheels mounted thereon, a rear driving axle thereon, rear driving ground wheels mounted on said axle, caterpillar driving sprocket wheels arranged to be concentrically secured to said rear driving ground wheels, radius rods pivotally mounted on said driving axle, a front driving axle secured thereto, front driving ground wheels mounted on said front driving axle, caterpillar driven sprocket wheels concentrically secured to said front driving ground wheels, caterpillar chains rove over said driving and driven caterpillar sprocket wheels, a screw secured to said frame and engaging a threaded member secured to said front driving axle, a jack shaft mounted in the rear of said rear driving axle, and sprocket chains geared to said jack shaft and driven sprocket wheel.

In witness that I claim the foregoing I have hereunto subscribed my name this 15th day of April, 1915.

W. A. RIDER.